United States Patent
Kim et al.

(10) Patent No.: US 12,152,103 B2
(45) Date of Patent: **\*Nov. 26, 2024**

(54) COPOLYMERIZED SATURATED POLYESTER RESIN AND COATING COMPOSITION CONTAINING SAME

(71) Applicant: SK CHEMICALS CO., LTD., Seongnam-si (KR)

(72) Inventors: Hyung-Gon Kim, Seongnam-si (KR); Jong-Ki Sim, Gunpo-si (KR); Soon-Ki Kim, Suwon-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 992 days.

This patent is subject to a terminal disclaimer.

(21) Appl. No.: 16/966,966

(22) PCT Filed: Jan. 31, 2019

(86) PCT No.: PCT/KR2019/001353
§ 371 (c)(1),
(2) Date: Aug. 3, 2020

(87) PCT Pub. No.: WO2019/156426
PCT Pub. Date: Aug. 15, 2019

(65) Prior Publication Data
US 2021/0040261 A1 Feb. 11, 2021

(30) Foreign Application Priority Data

Feb. 7, 2018 (KR) .................. 10-2018-0041988

(51) Int. Cl.
| | |
|---|---|
| *C09D 167/02* | (2006.01) |
| *C08G 63/183* | (2006.01) |
| *C08G 63/189* | (2006.01) |
| *C09D 7/63* | (2018.01) |

(52) U.S. Cl.
CPC ......... *C08G 63/183* (2013.01); *C08G 63/189* (2013.01); *C09D 7/63* (2018.01); *C09D 167/02* (2013.01)

(58) Field of Classification Search
CPC .............. C09D 167/02; C08G 63/183; C08G 2150/90; C08G 2390/40; C08G 63/12; C08G 63/137; C08G 63/181; C08G 63/189; C08G 63/199
See application file for complete search history.

(56) References Cited

U.S. PATENT DOCUMENTS

| | | | | |
|---|---|---|---|---|
| 2011/0190468 A1* | 8/2011 | Xu | .................. | C08G 63/60 528/45 |
| 2019/0077908 A1 | 3/2019 | Sim et al. | | |

FOREIGN PATENT DOCUMENTS

| | | | | |
|---|---|---|---|---|
| EP | 0752456 | * | 3/1996 | .......... C09D 167/02 |
| EP | 0 752 456 A2 | | 1/1997 | |
| JP | 2011-094048 A | | 5/2011 | |
| KR | 10-2004-0036045 A | | 4/2004 | |
| KR | 20040036045 | * | 4/2004 | ............. C08G 63/16 |
| KR | 10-2012-0113883 A | | 10/2012 | |
| KR | 10-2015-0055835 A | | 5/2015 | |
| KR | 10-2017-0116020 A | | 10/2017 | |
| WO | 2017/135582 A2 | | 8/2017 | |

OTHER PUBLICATIONS

KR20040036045A English translation (Year: 2004).*
International Search Report for PCT/KR2019/001353 dated May 30, 2019 [PCT/ISA/210].
Written Opinion for PCT/KR2019/001353 dated May 30, 2019 [PCT/ISA/237].

* cited by examiner

*Primary Examiner* — Ling Siu Choi
*Assistant Examiner* — Huihong Qiao
(74) *Attorney, Agent, or Firm* — Sughrue Mion, PLLC

(57) ABSTRACT

The present invention relates to a copolymerized saturated polyester resin and a coating composition containing same. Provided are a copolymerized saturated polyester resin and a coating composition having excellent hot water resistance, chemical resistance and processability when formed into a coating film, and showing excellent adhesiveness to a metal base, and thus particularly useful for coating a can and pre-coated metal (PCM).

15 Claims, No Drawings

COPOLYMERIZED SATURATED POLYESTER RESIN AND COATING COMPOSITION CONTAINING SAME

CROSS REFERENCE TO RELATED APPLICATIONS

This application is a National Stage of International Application No. PCT/KR2019/001353 filed Jan. 31, 2019, claiming priority based on Korean Patent Application No. 10-2018-0014988 filed Feb. 7, 2018.

TECHNICAL FIELD

The present invention relates to a copolymerized saturated polyester resin and a coating composition that comprises the same. In more detail, the present invention relates to a copolymerized saturated polyester resin and a coating composition, which are particularly useful for coating of cans and pre-coated metals (PCM) since they are excellent in hot water resistance, chemical resistance, processability, and adhesion to a metal substrate.

BACKGROUND ART

A coating composition that comprises a high molecular weight saturated polyester resin has excellent processability. But, since it easily becomes cloudy in a sterilization process at a high temperature, it is difficult to apply the same to a use that requires hot water resistance.

In particular, since packing food in a can is essentially required to sterilize the food under high heat and pressure, it has been continuously demanded that the cloudiness of a polyester resin in a high-temperature environment be improved. In addition, when the coating is applied to the interior of the can, it should have good chemical resistance to a variety of food. Various polyester resins have been developed in various monomer combinations in order to attain hot water resistance and chemical resistance to various food under such a high-temperature condition.

For example, conventionally, a method of suppressing the fluidity of a coating film at a high temperature by increasing the glass transition temperature of the polyester resin has been mainly used in which the permeation of moisture and a solvent is prevented. According to the above-mentioned conventional method, however, not only is the processability of a coating film greatly deteriorated due to the high glass transition temperature, but also the resin is not easily dissolved in a typical organic solvent, which restricts the production of a coating composition. In addition, If the glass transition temperature of a polyester resin is not significantly increased so as to reduce such side effects, it is difficult to attain the expected level of hot water resistance and chemical resistance.

DESCRIPTION OF THE INVENTION

Technical Problem

The phenomenon in which a coating film formed from a polyester resin becomes cloudy by water or a compound under a high-temperature condition is known to be mainly caused by hydrolysis of the polyester resin by moisture penetrated and diffused to the coating film. In particular, such hydrolysis is expedited in an aqueous solution that contains an acidic or basic compound and as the temperature is higher. Thus, in order to suppress such cloudiness and hydrolysis, it is necessary to suppress moisture penetration and diffusion into a coated film.

As a result of studies conducted by the present inventors, it was discovered that the hydrolytic stability can be secured by designing the structure of a resin so that moisture is hardly accessible to the ester bonds and that the proper branch structure of a polyester resin can maintain the excellent processability thereof and remarkably improve the hot water resistance and chemical resistance by suppressing the fluidity of a coating film.

Accordingly, an object of the present invention is to provide a copolymerized saturated polyester resin, which is excellent in processability and is capable of producing a coating film having excellent hot water resistance and chemical resistance.

In addition, another object of the present invention is to provide a coating composition, which comprises the copolymerized saturated polyester resin.

Technical Solution to the Problem

According to the object of the present invention, there is provided a copolymerized saturated polyester resin, which is formed by polycondensation of an acid component and an alcohol component, and has an intrinsic viscosity of 0.4 to 0.65 dl/g, a number average molecular weight of 12,000 to 20,000 g/mol, and a polydispersity index (PDI) of 3.0 to 5.0, wherein the acid component comprises (a-1) 90 to 99% by mole of an aromatic dicarboxylic acid or a $C_{1-2}$ alkyl ester thereof and (a-2) 0.5 to 2% by mole of a trifunctional or higher functional carboxylic acid or an anhydride thereof, and the alcohol component comprises (b-1) 20 to 55% by mole of an alicyclic polyhydric alcohol and (b-2) 45 to 80% by mole of an aliphatic polyhydric alcohol having a $C_{1-3}$ alkyl side chain.

According to another object of the present invention, there is provided a coating composition, which comprises the copolymerized saturated polyester resin.

Advantageous Effects of the Invention

The copolymerized saturated polyester resin is excellent in chemical resistance and hot water resistance in various media when formed into a coating film. Thus, it is useful for coating against high temperatures.

In addition, since the copolymerized saturated polyester resin is excellent in processability and flowability and has good adhesion to a metal substrate, it can be used for a coating on metals.

Therefore, a coating composition, which comprises the copolymerized saturated polyester resin, is particularly useful for a coating of pre-coated metals (PCM), as well as the inner surface of cans, that is subjected to high-temperature sterilization and in contact with various foods.

Best Mode for Carrying Out the Invention

Hereinafter, the present invention will be described in more detail.

Copolymerized Saturated Polyester Resin

The present invention provides a copolymerized saturated polyester resin, which is formed by polycondensation of an acid component and an alcohol component, and has an intrinsic viscosity of 0.4 to 0.65 dl/g, a number average molecular weight of 12,000 to 20,000 g/mol, and a polydispersity index (PDI) of 3.0 to 5.0, wherein the acid component comprises (a-1) 90 to 99% by mole of an aromatic dicarboxylic acid or a $C_{1-2}$ alkyl ester thereof and (a-2) 0.5 to 2% by mole of a trifunctional or higher functional carboxylic acid or an anhydride thereof, and the alcohol component comprises (b-1) 20 to 55% by mole of an alicyclic polyhydric alcohol and (b-2) 45 to 80% by mole of an aliphatic polyhydric alcohol having a $C_{1-3}$ alkyl side chain.

Hereinafter, each component will be specifically described.

(a) Acid Component

The copolymerized saturated polyester resin comprises (a-1) an aromatic dicarboxylic acid or a $C_{1-2}$ alkyl ester thereof and (a-2) a trifunctional or higher functional carboxylic acid or an anhydride thereof as an acid component.

The copolymerized saturated polyester composition is structurally less fluidic due to the acid component (a-1), whereby the diffusion of moisture can be suppressed. In addition, a branched structure is formed due to the acid component (a-2), whereby a coating film having a denser structure can be obtained. As a result, it is possible to enhance the hot water resistance and chemical resistance by effectively suppressing the movement and diffusion of moisture.

The acid component (a-1) may be at least one selected from the group consisting of isophthalic acid, terephthalic acid, 2,6-naphthalene dicarboxylic acid, and $C_{1-2}$ alkyl esters thereof.

The content of the acid component (a-1) (based on the total acid components) is 90 to 99% by mole. If the content of the acid component (a-1) is less than 90% by mole, the glass transition temperature of the resin is excessively low, thereby making it difficult to secure adequate hot water resistance and hardness.

More specifically, the content of the acid component (a-1) (based on the total acid components) may be 90 to 95% by mole, 93 to 99% by mole, 95 to 99% by mole, or 93 to 97% by mole.

In addition, the acid component (a-2) may be at least one selected from trimellitic acid and an anhydride thereof.

The content of the acid component (a-2) (based on the total acid components) is 0.5 to 2% by mole. If the content of the acid component (a-2) is less than 0.5% by mole, it is difficult to attain a sufficient level of hot water resistance. If the content is greater than 2% by mole, gelation occurs during the synthesis of the resin, or the viscosity of the resin becomes excessively high, thereby deteriorating the processability of a coating.

More specifically, the content of the acid component (a-2) (based on the total acid components) may be 0.5 to 1.5% by mole, 1 to 2% by mole, 1.5 to 2% by mole, or 0.5 to 1% by mole.

In addition, the copolymerized saturated polyester resin may further comprise an aliphatic dicarboxylic acid as an additional acid component. For example, the aliphatic dicarboxylic acid may be selected from the group consisting of sebacic acid, succinic acid, azelaic acid, and combinations thereof.

The aliphatic dicarboxylic acid may be contained in an amount of 0.1 to 10% by mole, 0.1 to 9% by mole, 0.1 to 7% by mole, or 0.1 to 5% by mole, based on the total acid components.

(b) Alcohol Component

The copolymerized saturated polyester resin comprises (b-1) an alicyclic polyhydric alcohol and (b-2) an aliphatic polyhydric alcohol having a $C_{1-3}$ alkyl side chain as an acid component.

Since the copolymerized saturated polyester resin comprises the alicyclic polyhydric alcohol and the aliphatic polyhydric alcohol components, it becomes difficult for moisture to access the ester bonds, whereby hydrolysis resistance can be secured.

In addition, if the contents of the alicyclic polyhydric alcohol and the aliphatic polyhydric alcohol components are controlled within the above content ranges, the solvent solubility for readily preparing a coating composition can be imparted.

The alcohol component (b-1) may be at least one selected from the group consisting of cyclohexane dimethanol, tricyclodecane dimethanol, and isosorbide.

The content of the alcohol component (b-1) (based on the total alcohol components) is 20 to 55% by mole, more specifically 30 to 40% by mole. If the content of the alcohol component (b-1) is less than 20% by mole, it is difficult to attain sufficient chemical resistance and hot water resistance. If the content is greater than 55% by mole, it is not dissolved in a solvent used in the coating composition, or the processability is significantly deteriorated.

More specifically, the content of the alcohol component (b-1) (based on the total alcohol components) may be 25 to 55% by mole, 30 to 55% by mole, 35 to 55% by mole, or 20 to 50% by mole.

In addition, the alcohol component (b-2) may be at least one selected from the group consisting of 2,2-dimethyl-1,3-propanediol, 2-methyl-1,3-propanediol, 1,3-butanediol, and 1,2-propylene glycol.

In particular, the sum of the carbon atoms that constitute the side chain in the alcohol component (b-2) is preferably 3 or less.

If the carbon chain as the side chain is long, there is a possibility that the chemical resistance and the hot water resistance may be impaired when a coating composition is applied.

The content of the alcohol component (b-2) (based on the total alcohol components) is 45 to 80% by mole, more specifically 60 to 70% by mole. If the content of the alcohol component (b-2) is less than 45% by mole, the flowability and solubility are significantly deteriorated. In the content is greater than 80% by mole, the hot water resistance is deteriorated.

More specifically, the content of the alcohol component (b-2) (based on the total alcohol components) may be 45 to 75% by mole, 45 to 70% by mole, 45 to 65% by mole, or 50 to 80% by mole.

Characteristics of the Copolymerized Saturated Polyester Resin

In the present invention, as the copolymerized saturated polyester resin has a high molecular weight at a specific level, it is possible to impart flexibility at the time of processing a coated substrate.

The copolymerized saturated polyester resin may have an intrinsic viscosity of 0.4 to 0.65 dl/g, more specifically 0.45 to 0.60 dl/g, 0.45 to 0.65 dl/g, or 0.4 to 0.6 dl/g.

The copolymerized saturated polyester resin has a number average molecular weight of 12,000 to 20,000 g/mol. If the number average molecular weight of the copolymerized saturated polyester resin is less than 12,000 g/mol, the processability becomes poor. If it is greater than 20,000 g/mol, the viscosity increases, which impairs the coating processability when it is used for a paint.

More specifically, the copolymerized saturated polyester resin may have a number average molecular weight of 14,000 to 19,000 g/mol, 16,000 to 19,000 g/mol, 14,000 to 17,000 g/mol, 12,000 to 17,000 g/mol, or 16,000 to 20,000 g/mol.

The copolymerized saturated polyester resin has a polydispersity index (PDI) in the range of 3.0 to 5.0. The polydispersity index is calculated as a ratio (Mw/Mn) of the weight average molecular weight to the number average molecular weight, which is an indicator for determining whether the branched structure is capable of improving the hot water resistance of the resin. If the polydispersity index of the copolymerized saturated polyester resin is within the range of 3.0 to 5.0, good hot water resistance and melt viscosity can be attained.

More specifically, the copolymerized saturated polyester resin may have a PDI in the range of 3.0 to 4.0, 4.0 to 5.0, 3.5 to 4.5, 3.5 to 5.0, or 2.5 to 5.0.

The copolymerized saturated polyester resin may have a glass transition temperature (Tg) in the range of 40 to 80° C. Within the above range, it may be more advantageous to improve the performance by suppressing the fluidity of a resin coating film by hot water.

More specifically, the copolymerized saturated polyester resin may have a Tg in the range of 40 to 70° C., 40 to 60° C., 50 to 70° C., 60 to 70° C., or 45 to 65° C.

Process for Preparing the Copolymerized Saturated Polyester Resin

The copolymerized saturated polyester resin of the present invention may be prepared by a conventional esterification and polycondensation process. For example, the acid component and the alcohol component are charged to a reactor, followed by the addition of an esterification catalyst thereto. Then, the temperature is gradually raised from room temperature to about 200 to 260° C. When such a byproduct as water or methanol is discharged, a polycondensation catalyst and a heat stabilizer are added. The reaction temperature is raised to 220 to 280° C., and copolymerization is carried out for several hours, to thereby obtain a polyester resin having an appropriate intrinsic viscosity.

In such event, examples of the acid component and the alcohol component to be employed are as described above.

In addition, the polymer structure can be appropriately controlled by dividing and adding the trifunctional or higher functional carboxylic acid or an anhydride thereof to the esterification reaction step and the polycondensation step at the time of the production.

Specifically, the trifunctional or higher functional carboxylic acid or an anhydride thereof may be fed in the esterification step to have a branched structure. Alternatively, it may be added to the polycondensation step to adjust the acid value along with a proper level of branched structure, thereby increasing the adhesion of a coating film.

An esterification catalyst, a polycondensation catalyst, a heat stabilizer, and the like may be further added during the production of the copolymerized saturated polyester resin. Examples of the esterification catalyst include an acetate of Ca, Ce, Pb, Mn, Zn, Mg, Sb, or the like, and tetrabutoxy titanium. In addition, examples of the polycondensation catalyst include $Sb_2O_3$, $GeO_2$, tetrabutoxy titanium, and the like. Examples of the heat stabilizer include a phosphate, phosphoric acid, and the like.

In particular, it is possible in the present invention to provide a copolymerized saturated polyester resin having no unsaturated bonds in its final resin structure by carrying out the esterification and polycondensation reactions with a saturated compound having no unsaturated bonds such as a double bond as an acid component and an alcohol component to be employed as the monomers for copolymerization of the polyester resin.

Since the copolymerized saturated polyester resin of the present invention as described above has no unsaturated bonds, it is possible to prevent the physical properties from changing in response to heat, light, and the like. In addition, the copolymerized saturated polyester resin as described above may be suitable as a thermoplastic resin for forming a coating film.

Coating Composition

The present invention also provides a coating composition, which comprises the copolymerized saturated polyester resin.

For example, the coating composition may comprise a copolymerized saturated polyester resin, a curing agent, a solvent, an additive, and the like.

In such event, the composition and characteristics of the copolymerized saturated polyester resin are as described above.

The curing agent may be at least one selected from the group consisting of a phenol-formaldehyde resin, a polyfunctional polyisocyanate compound, a melamine-formaldehyde resin, a benzoguanamine resin, and combinations thereof.

Preferably, if a phenol-formaldehyde resin is used as the curing agent, it is advantageous to attain excellent physical properties in terms of hot water resistance and chemical resistance. Examples of the commercially available phenol-formaldehyde resin include PR516, PR566, PR827, and VPR1785 from Allnex.

The weight ratio of the copolymerized saturated polyester resin to the curing agent may be in the range of 95:5 to 40:60, more specifically in the range of 90:10 to 50:50.

The solvent may be an ester-based, glycol ether-based, ketone-based, aromatic hydrocarbon-based, aliphatic hydrocarbon-based, or alcohol-based solvent. More specifically, xylene, propylene glycol monoethyl acetate, and dibasic esters are suitable.

In addition, examples of the additive may include a pigment, a wax, a lubricant, a defoaming agent, a wetting agent, a catalyst, and the like.

The coating composition is particularly useful for coating of the inner and outer surfaces of cans and PCM since it is significantly improved in terms of hot water resistance and chemical resistance and is excellent in processability.

EMBODIMENTS FOR CARRYING OUT THE INVENTION

Specific Examples and Test Examples

Hereinafter, the present invention will be described in more detail with reference to Examples, but the scope of the present invention is not limited thereto.

The measurement and evaluation methods in the following Examples are as follows.

Intrinsic viscosity (IV): measured at 35° C. using a Cannon-UbbeLodhe type viscometer with an ortho-chlorophenol solvent.

Glass transition temperature (Tg): measured by differential scanning calorimetry (DSC).

Number average molecular weight (Mn): a sample was dissolved in tetrahydrofuran and measured by gel permeation chromatography (WATERS GPC 150-CV). Polystyrene (Shodex SM-105, Showa Denko, Japan) was used as a standard material.

Solvent resistance: a sample was coated on a tin-plated steel plate having a thickness of 0.3 mm and dried with hot air at 210° C. for 10 minutes to obtain a coated steel plate. A soft cloth was soaked with methyl ethyl ketone (MEK) and wound around the fingers. The surface of the coated steel plate was reciprocally rubbed with the cloth, and the number of reciprocations was counted until the coating film was damaged.

Hot water resistance (desalted water): a sample was coated on a tin-plated steel plate having a thickness of 0.3 mm and dried with hot air at 210° C. for 10 minutes to obtain a coated steel plate. The coated steel plate and desalted water were placed in an autoclave and sterilized at 125° C. for 30 minutes. The degree of cloudiness (or damage) of the surface was observed and evaluated with the best condition rated at a maximum of 10. In addition, upon the sterilization, a soft cloth was soaked with MEK and wound around the fingers. The surface of the coated steel plate was reciprocally rubbed with the cloth, and the number of reciprocations was counted until the coating film was damaged.

Hot water resistance (acid): a sample was coated on a tin-plated steel plate having a thickness of 0.3 mm and dried with hot air at 210° C. for 10 minutes to obtain a coated steel plate. The coated steel plate was immersed in an aqueous solution of 3% acetic acid at 100° C. for 3 hours. The degree of cloudiness (or damage) of the surface was observed and evaluated with the best condition rated at a maximum of 10. In addition, upon the sterilization, a soft cloth was soaked with MEK and wound around the fingers. The surface of the coated steel plate was reciprocally rubbed with the cloth, and the number of reciprocations was counted until the coating film was damaged.

Hot water resistance (salt): a sample was coated on a tin-plated steel plate having a thickness of 0.3 mm and dried with hot air at 210° C. for 10 minutes to obtain a coated steel plate. The coated steel plate was immersed in an aqueous solution of 2% calcium chloride at 100° C. for 3 hours. The degree of cloudiness (or damage) of the surface was observed and evaluated with the best condition rated at a maximum of 10. In addition, upon the sterilization, a soft cloth was soaked with MEK and wound around the fingers. The surface of the coated steel plate was reciprocally rubbed with the cloth, and the number of reciprocations was counted until the coating film was damaged.

Flexibility: a sample was coated on a tin-plated steel plate having a thickness of 0.3 mm and dried with hot air at 210° C. for 10 minutes to obtain a coated steel plate. The coated steel plate was bent at an angle of 180° with at least one steel plate having the same thickness interposed therebetween to completely bend the steel plate. They were then immersed for 10 minutes in a copper (II) sulfate solution in which deionized water, copper sulfate, and hydrochloric acid were mixed at a weight ratio of 7:2:1. The immersed coated steel plate was observed for oxidation of the coating film around the cracks due to bending. The number of the minimum number of interposed steel plates without oxidation was counted.

A. Preparation of a Copolymerized Saturated Polyester Resin

A 500-ml three-necked flask equipped with a thermometer, a condenser, a mental, a stirrer, and a vacuum pump was charged with an acid component and an alcohol component in the composition shown in Table 1 below, followed by addition thereto of tetrabutoxy titanium as an esterification catalyst. When water and methanol as byproducts were generated in the theoretical amounts as the temperature was gradually raised to 240° C., tetrabutoxy titanium as a polycondensation catalyst was added thereto. The temperature was raised to 260° C., and the reaction was carried out under vacuum for several hours. As a result, a copolymerized saturated polyester resin having an intrinsic viscosity of 0.4 to 0.65 dl/g and a number average molecular weight of 12,000 to 20,000 g/mol was obtained as shown in Table 1 below.

TABLE 1

| | | Example | | | Comparative Example | | | |
| --- | --- | --- | --- | --- | --- | --- | --- | --- |
| | | 1 | 2 | 3 | 1 | 2 | 3 | 4 |
| Acid component (g) | Isophthalic acid | 306.93 | 294.13 | 285.16 | 306.93 | 202.51 | 255.86 | 268.58 |
| | Terephthalic acid | 76.73 | — | 76.04 | 76.73 | 202.51 | 63.97 | 67.15 |
| | 2,6-naphthalene dicarboxylic acid | — | 95.69 | — | — | — | — | — |
| | Sebacic acid | — | — | 23.14 | — | — | — | — |
| | Trimellitic anhydride | 3.99 | 3.82 | 3.96 | — | — | 3.33 | — |
| Alcohol component (g) | Ethylene glycol | — | — | — | — | 112.68 | — | — |
| | 2,2-dimethyl-1,3-propanediol | — | — | — | — | 181.65 | — | — |
| | 2-methyl-1,3-propanediol | 197.51 | 189.27 | 195.73 | 197.51 | — | — | 118.28 |
| | 2-butyl-2-ethyl-1,3-propanediol | — | — | — | — | — | 292.79 | — |
| | 1,4-cyclohexane dimethanol | 116.90 | 112.02 | 115.85 | 116.90 | — | 97.45 | 106.08 |
| | Tricyclodecane dimethanol | — | — | — | — | — | — | 128.91 |
| Physical properties | Intrinsic viscosity (dl/g) | 0.5 | 0.56 | 0.64 | 0.47 | 0.42 | 0.52 | 0.44 |
| | Glass transition temperature (° C.) | 57 | 61.4 | 46.9 | 53.8 | 63.5 | 53.0 | 72.50 |
| | Number average molecular weight (g/mol) | 14,296 | 18,903 | 19,542 | 15,359 | 14,327 | 18,711 | 15,824 |
| | Weight average molecular weight (g/mol) | 45,890 | 66.342 | 83,387 | 32.561 | 29,943 | 70,158 | 38,007 |
| | PDI | 3.21 | 3.51 | 4.27 | 2.12 | 2.09 | 3.75 | 2.40 |

B. Preparation of a Coating Composition

The copolymerized saturated polyester resins prepared in Examples 1 to 3 and Comparative Examples 1 to 4 were each diluted with a mixed solvent of xylene/diacetone alcohol (7/3, v/v) to prepare a resin solution having a solids content of 40% by weight. It was further compounded with the components as shown in Table 2 below to finally prepare a coating composition having a solids content of 35% by weight.

TABLE 2

| Components in the coating composition | Content (g) |
|---|---|
| Resin solution of 40% by weight (solvent: xylene/diacetone alcohol = 7/3, v/v) | 140 |
| Phenol resin solution of 60% by weight (PR 516-60B, Allnex) | 23.33 |
| Xylene | 25.67 |
| Diacetone alcohol | 11.0 |
| Phosphoric acid catalyst (XK406N, Allnex) | 0.70 |

C. Evaluation of a Coating Film

The coating compositions prepared above were each coated on a tin-plated steel plate having a thickness of 0.3 mm to a thickness of 6 to 10 μm, which was dried and cured at 210° C. for 10 minutes in an automatic discharge oven to obtain a coating film. The coating film was evaluated for solvent resistance, flexibility, and hot water resistance. The results are shown in Table 3 below.

TABLE 3

| Evaluation | Details | Example 1 | Example 2 | Example 3 | Comparative Example 1 | Comparative Example 2 | Comparative Example 3 | Comparative Example 4 |
|---|---|---|---|---|---|---|---|---|
| Solvent resistance | MEK reciprocations (number) | 50 | 85 | 100 | 28 | 7 | 28 | 25 |
| Flexibility | Interposed steel plate (number) | 1 | 1 | 1 | 0 | 3 | 4 | 2 |
| Hot water resistance (desalted water) | Evaluation of cloudiness | 8/10 | 10/10 | 9/10 | 4/10 | 4/10 | 5/10 | 6/10 |
| | MEK reciprocations (number) | 45 | 87 | 60 | 14 | 8 | 26 | 12 |
| Hot water resistance (acid) | Evaluation of cloudiness | 7/10 | 8/10 | 8/10 | 5/10 | 5/10 | 6/10 | 6/10 |
| | MEK reciprocations (number) | 33 | 93 | 54 | 10 | 6 | 14 | 8 |
| Hot water resistance (salt) | Evaluation of cloudiness | 8/10 | 9/10 | 7/10 | 7/10 | 5/10 | 6/10 | 7/10 |
| | MEK reciprocations (number) | 33 | 88 | 75 | 9 | 5 | 12 | 10 |

As shown in Table 3 above, when the copolymerized saturated polyester resins according to the Examples were each coated, the solvent resistance, flexibility, and hot water resistance were all excellent.

The invention claimed is:

1. A copolymerized saturated polyester resin, which is formed by polycondensation of an acid component and an alcohol component, and
has an intrinsic viscosity of 0.4 to 0.65 dl/g, a number average molecular weight of 12,000 to 20,000 g/mol, and a polydispersity index (PDI) of 3.0 to 5.0,
wherein the acid component comprises (a-1) 90 to 95% by mole of an aromatic dicarboxylic acid or a $C_{1-2}$ alkyl ester thereof and (a-2) 0.5 to 1.5% by mole of a trifunctional or higher functional carboxylic acid or an anhydride thereof,
wherein the alcohol component comprises (b-1) 20 to 55% by mole of an alicyclic polyhydric alcohol and (b-2) 45 to 80% by mole of an aliphatic polyhydric alcohol having a $C_{1-3}$ alkyl side chain, and
wherein the alicyclic polyhydric alcohol (b-1) is one or more selected from the group consisting of cyclohexane dimethanol, tricyclodecane dimethanol, and isosorbide.

2. The copolymerized saturated polyester resin of claim 1, wherein the aromatic dicarboxylic acid or a $C_{1-2}$ alkyl ester thereof (a-1) is one or more selected from the group consisting of isophthalic acid, terephthalic acid, 2,6-naphthalene dicarboxylic acid, and $C_{1-2}$ alkyl esters thereof; and
the trifunctional or higher functional carboxylic acid or an anhydride thereof (a-2) is one or more selected from the group consisting of trimellitic acid and an anhydride thereof.

3. A coating composition, which comprises the copolymerized saturated polyester resin of claim 2.

4. The coating composition of claim 3, which further comprises a curing agent, wherein the curing agent is one or more selected from the group consisting of a phenol-formaldehyde resin, a polyfunctional polyisocyanate compound, a melamine-formaldehyde resin, a benzoguanamine resin, and combinations thereof.

5. The copolymerized saturated polyester resin of claim 1, wherein the aliphatic polyhydric alcohol having a $C_{1-3}$ alkyl side chain (b-2) is one or more selected from the group consisting of 2,2-dimethyl-1,3-propanediol, 2-methyl-1,3-propanediol, 1,3-butanediol, and 1,2-propylene glycol.

6. A coating composition, which comprises the copolymerized saturated polyester resin of claim 5.

7. The coating composition of claim 6, which further comprises a curing agent, wherein the curing agent is one or more selected from the group consisting of a phenol-formaldehyde resin, a polyfunctional polyisocyanate compound, a melamine-formaldehyde resin, a benzoguanamine resin, and combinations thereof.

8. The copolymerized saturated polyester resin of claim 1, wherein the acid component further comprises an aliphatic dicarboxylic acid in an amount of 0.1 to 9% by mole.

9. A coating composition, which comprises the copolymerized saturated polyester resin of claim 8.

10. The coating composition of claim 9, which further comprises a curing agent, wherein the curing agent is one or more selected from the group consisting of a phenol-formaldehyde resin, a polyfunctional polyisocyanate compound, a melamine-formaldehyde resin, a benzoguanamine resin, and combinations thereof.

11. The copolymerized saturated polyester resin of claim 1, which has a glass transition temperature in the range of 40 to 80° C.

12. A coating composition, which comprises the copolymerized saturated polyester resin of claim 11.

13. The coating composition of claim 12, which further comprises a curing agent, wherein the curing agent is one or more selected from the group consisting of a phenol-formaldehyde resin, a polyfunctional polyisocyanate compound, a melamine-formaldehyde resin, a benzoguanamine resin, and combinations thereof.

14. A coating composition, which comprises the copolymerized saturated polyester resin of claim 1.

15. The coating composition of claim 14, which further comprises a curing agent, wherein the curing agent is one or more selected from the group consisting of a phenol-formaldehyde resin, a polyfunctional polyisocyanate compound, a melamine-formaldehyde resin, a benzoguanamine resin, and combinations thereof.

\* \* \* \* \*